United States Patent [19]
Ge et al.

[11] Patent Number: 5,920,679
[45] Date of Patent: Jul. 6, 1999

[54] APPARATUS AND METHOD FOR COMPUTER-AIDED LOW-HARMONIC TRAJECTORY PLANNING FOR COMPUTER-CONTROLLED MACHINERY

[75] Inventors: Q. Jeffrey Ge, East Setauket; Jahangir S. Rastegar, Stony Brook, both of N.Y.

[73] Assignee: The Research Foundation of State University of New York, Albany, N.Y.

[21] Appl. No.: 08/918,166

[22] Filed: Aug. 25, 1997

[51] Int. Cl.⁶ .................................................. G06F 19/00
[52] U.S. Cl. ................ 395/97; 318/568.15; 364/167.07; 364/474.31; 395/87
[58] Field of Search ................................ 395/80, 88, 97, 395/87; 364/167.02, 167.07, 474.29, 474.24, 474.31; 345/441, 442; 318/573, 568.11, 568.15

[56] References Cited

U.S. PATENT DOCUMENTS

| | | | |
|---|---|---|---|
| 5,179,514 | 1/1993 | Rastegar et al. | 395/97 X |
| 5,331,542 | 7/1994 | Itoh | 318/568.18 X |
| 5,377,310 | 12/1994 | Jain et al. | 395/95 |
| 5,390,292 | 2/1995 | Takamura et al. | 364/474.24 X |
| 5,424,962 | 6/1995 | Bouchez et al. | 364/152 X |
| 5,426,722 | 6/1995 | Batchelder | 395/80 |
| 5,497,061 | 3/1996 | Nonaka et al. | 395/97 X |
| 5,604,413 | 2/1997 | Khorrami et al. | 318/632 |
| 5,726,896 | 3/1998 | Via et al. | 364/474.24 X |

FOREIGN PATENT DOCUMENTS 710 529 A1   5/1996   European Pat. Off. .

OTHER PUBLICATIONS

Q.J. Ge et al. (1995) "Low–Harmonic Rational Bezier and Spline Curves for Joint Trajectory Synthesis With . . ." *Proc. of IEEE International Conference on Robotics and Automation*: 2433–2438; May 1995.

Q.J. Ge et al. (1995) "Special Classes of Rational Curves With Low Harmonic Content for Optimal Robot Manipulator . . ." *Proc. of IFTOMM World Congress*; Aug. 1995.

Q.J. Ge et al. (1997) "Bernstein–Bezier Harmonics and Their Application to Robot Trajectory Synthesis . . ." *ASME Journal of Mechanical Design in publication*; 1997.

Q.J. Ge et al. (1997) "Low–Harmonic Rational Bezier Curves for Trajectory Generation of High–Speed Machinery" *Journal of Computer Aided Geometric Design in publication*; 1997.

A. Gentile et al. (1996) "WMR Trajectory Planning by Means of Bezier Curves" *Proc. of IEEE*: 851–856; Jul. 1996.

A. Arakawa et al. (1995) "Trajectory Generation for Wheeled Mobile Robot Based on Landmarks" *Proc. of IEEE*: 1273–1278; 1995.

Y. Konishi et al, (1988) "Trajectory Generation and Control of a Five–Bar–Link Parallel Direct–Drive Robot" *Robotics & Computer–integrated Manufacturing* 4(3/4): 395–402; 1988.

*Primary Examiner*—Joseph Ruggiero
*Attorney, Agent, or Firm*—Scully, Scott, Murphy & Presser

[57] ABSTRACT

A method for using a special class of low-harmonic Bezier curves to plan and generate trajectory patterns for computer-controlled machinery in which desired motion information is input into a first processor. A low-harmonic trajectory is then generated from the desired motion information according to the low-harmonic Bezier curves and output into a second processor where points along the low-harmonic trajectory are computed. Each point on the trajectory is then output, amplified, and input into an actuator for performing a desired motion, but which results in an actual motion. The actual motion is then compared to the desired motion in a comparing means which computes an error. A feedback control signal is then generated to correct the error. Lastly, the method is repeated for all points on the trajectory until the trajectory is complete or the operation is terminated. Another aspect of the present invention is an apparatus for carrying out the method of the present invention.

46 Claims, 7 Drawing Sheets

APPARATUS AND METHOD FOR COMPUTER-AIDED LOW-HARMONIC TRAJECTORY PLANNING FOR COMPUTER-CONTROLLED MACHINERY

CROSS REFERENCE TO RELATED APPLICATION

This is a conversion of provisional application Ser. No. 60/023,239 filed Aug. 23, 1996.

GOVERNMENT RIGHTS

This invention was developed in part with government sponsored research under research agreement CMS-9632173 granted by the National Science Foundation (NSF).

BACKGROUND OF THE INVENTION

1. Field of the Invention

This invention generally relates to computer controlled machinery, and more particularly, to a method and apparatus for generating low-harmonic trajectories for computer-controlled machinery.

2. Prior Art

For computer-controlled machinery, a significant source of internally induced vibrational excitation is the presence of high frequency harmonics in the trajectories that the components of the computer controlled machine must use.

Polynomial and spline curves have been widely used for robot trajectory synthesis. The resulting trajectories, when expressed in Fourier series, generally indicate a considerable number of harmonics with high-frequencies in the joint (i.e., actuator) coordinate system. The problem becomes even greater for robot manipulators constructed with revolute joints, due to the nonlinearity of the kinematic mapping between the task and the joint coordinates. The nonlinearity of the dynamics of robot manipulators with revolute joints also increases the harmonic content of the actuating torques or forces. For higher operating speeds, the higher harmonics present in the actuating torques required for accurate tracking of the trajectory may be well above the dynamic response limitations ("bandwidth") of currently available (even high performance and direct drive) actuators.

In the prior art, low-harmonic trajectories are generated using a fundamental sinusoidal time function and (n−1) number of its harmonics, as seen by the following equation (1) where $\omega$ denotes the fundamental frequency of the trajectory pattern, $t_e$ denotes the time needed to complete the trajectory pattern, and $s_i$, $c_i$ denote m-dimensional vectors of constant trajectory parameters;

$$q^n(t) = c_0 + \sum_{i=1}^{n} [s_i \sin(i\omega t) + c_i \cos(i\omega t)], \quad 0 \le t \le t_e \tag{1}$$

The problem with this approach is that it is difficult to select the coefficient vectors $s_i$ and $c_i$ to prescribe the shape of the trajectory, and the trajectory is not compatible with synthesis in a computer aided environment.

SUMMARY OF THE INVENTION

Therefore, it is an object of the present invention to use Bezier Curves to synthesize trajectories within the dynamic response limitation of the actuators of a motion machine while avoiding excitation of the natural modes of vibration of the machine.

Another object of the present invention is to use a special class of rational Bezier curves for synthesizing joint trajectories of a robot with minimal amplitudes of high harmonics of the actuator torques (forces) required for accurate tracking of the trajectory.

Still another object of the present invention is to provide a low harmonic trajectory in a form that is compatible with current computer aided design systems.

Still yet another object of the present invention is to provide a low harmonic trajectory in a form which provides intuitive control over the shape of the harmonic trajectory.

Accordingly, the present invention provides a method of using a special class of low-harmonic Bezier curves to generate trajectory patterns for computer-controlled machinery in which desired motion information is input into a first processor. A low-harmonic trajectory is then generated from the desired motion information according to the following equation (2), $b_i$ are Bezier control points and $\bar{B}_i^{2n}$ are Bernstein harmonic basis functions of order n:

$$b_0^{2n} = \sum_{i=0}^{2n} b_i \bar{B}_i^{2n} \tag{2}$$

The generated low-harmonic trajectory is then outputted from the first processor to input a second processor. Points along the low-harmonic trajectory are computed and converted into an electrical representation having a current and/or a voltage. Each point is then outputted as a first electrical signal corresponding to a point on the trajectory to input a power amplifier. The first electrical signal is then amplified resulting in a second electrical signal which is inputted into an actuator for performing a desired motion, but which results in an actual motion. The actual motion is then compared to the desired motion by a comparing means which computes an error. A feedback control signal is then generated to correct the error. Lastly, all steps from computing the points along the trajectory to generating the feedback control signal are repeated for all points on the trajectory until the trajectory is complete or the operation is terminated.

Another aspect of the present invention is an apparatus for generating a low-harmonic trajectory in Bernstein-Bezier form from a set of desired motion information requirements for a computer controlled machine having at least one axis of motion. The apparatus has a first processor having an input device. The first processor generates and outputs a low-harmonic trajectory from the desired motion information according to equation (2) above.

The apparatus further has a second processor for receiving the outputted low-harmonic trajectory, computing points along the low-harmonic trajectory, and converting the points into an electrical signal having a current and/or voltage. A power amplifier is provided for receiving the electrical signal from the second processor and for amplifying the electrical signal to drive an actuating means. The actuating means controls the motion along each axis, whereby the received amplified signal from the power amplifier identifies the performance of a desired motion. The performance of the desired motion results in an actual motion. A sensing means is also provided for sensing the actual motion performed by the actuating means and for outputting the sensed actual motion in the form of an electrical signal. A comparing means is also provided for comparing the sensed actual motion to the desired motion for determining a measured error in the path and its time history. Lastly, a control means for generating a feedback control signal based upon the measured error is provided for correction of that error.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Figure 2:
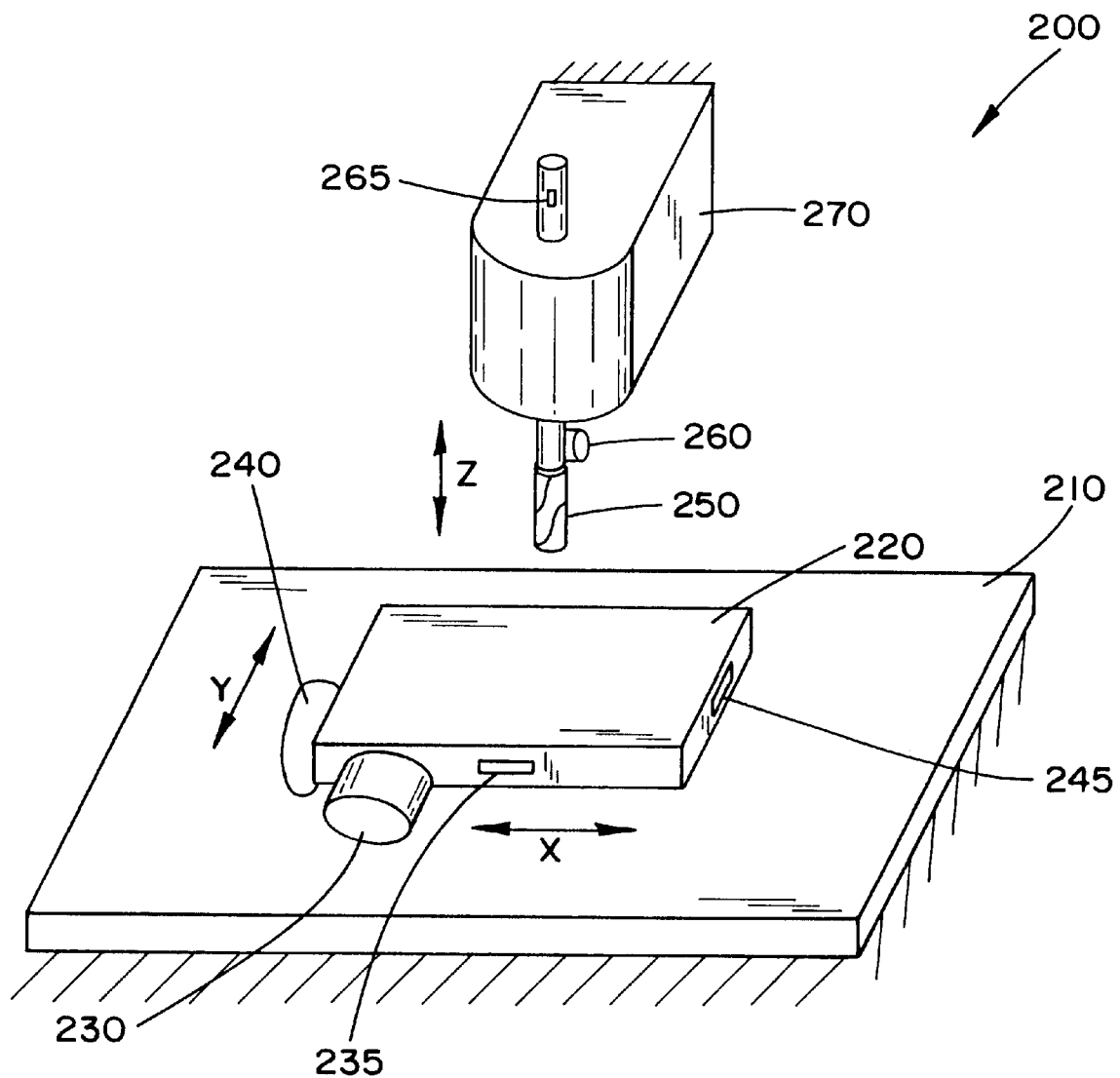
FIG. 2 illustrates a CNC machine to be controlled by the apparatus and method of the present invention.
Figure 3:
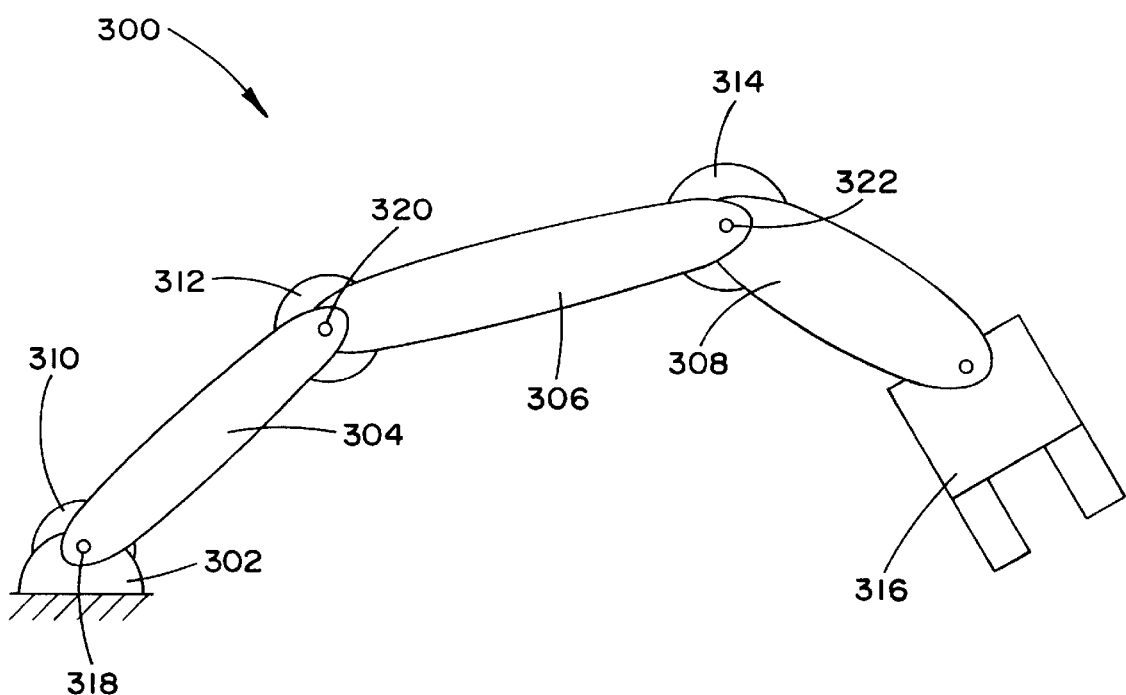
FIG. 3 illustrates a robotic arm to be controlled by the apparatus and method of the present invention.

Referring to FIGS. 2 and 3, illustrated therein are two examples of computer controlled machines in which the apparatus and method of the present invention is used to generate a low-harmonic trajectory for the motion components of the machines.

FIG. 2 illustrates a CNC machine, generally referred to by reference numeral 200. The CNC machine 200 has a base 210 upon which an x-y table 220 is capable of movement in both the x and y directions. A x-actuator 230 facilitates movement along the X-axis. Similarly, a y-actuator 240 facilitates movement along the y-axis. Typically, the actuators 230, 240 are linear or rotary direct current servo motors, linear or rotary direct drive motors, or stepper motors which drive a gear train (not shown) which meshes with the x-y table 220.

An x-sensor 235 and a y-sensor 245 sense the x and y motion respectively and convert the sensed motion to an electrical signal representation.

A cutting tool 250 is rotatably mounted on a head 270. The cutting tool is typically an end mill for machining metal and plastics. Besides rotating, the cutting tool also traverses the z-axis. A z-actuator 260 facilitates movement of the cutting tool 250 along the z-axis. Typically, the z-actuator 260 is a linear or rotary direct current servo motors, linear or rotary direct drive motors or stepper motor which drives a gear train which meshes with the cutting tool 250 shaft. A z-sensor 265 senses the motion of the cutting tool 250 along the z-axis and converts the motion into an electrical signal representation.

The sensors 235, 245, and 265 can have an analog output such as a Hall effect sensor or a potentiometer, or they can have a digital output such as an optical encoder. A computer or microprocessor guides the cutting tool 250 along a trajectory in x-y-z space according to inputted desired motion information.

The CNC machine 200 illustrated in FIG. 2 has four operating axes, the x, y, z axes and the rotation of the cutting tool 250. However, it can be appreciated by one skilled in the art that the present invention can be utilized for generating and planning a trajectory for a computer controlled machine having at least one axis of motion.

Referring now to FIG. 3, there is illustrated a robotic arm, generally referred to by reference numeral 300. The robotic arm 300 has a base 302 on which a first link 304 is pivotally mounted. A second link 306 is pivotally mounted to the first link 304 and a third link 308 is pivotally mounted on the second link 306. An end effector 316 is pivotally mounted on the third link 308. At the pivot points between the base 302 and first link 304, between links, and between the third link 308 and the end effector 316 are located first, second and third actuators 310, 312, and 314 respectively. Also located at the pivot points are first, second, and third sensors 318, 320, and 322 respectively.

The actuators 310, 312, and 314 are typically linear or rotary direct current servo motors, linear or rotary direct drive motors, or stepper motors which impart a motion to the links 304, 306, 308, and/or the end effector 316, which typically has a built-in actuator (not shown).

As discussed previously, the sensors 318, 320, and 322 can be a Hall effect sensor, a potentiometer, an optical encoder, or any sensor known in the art. The sensors typically output their signal to a computer processor which inputs the actuators to impart a desired motion according to inputted desired motion information.

The robotic arm 300 illustrated in FIG. 3 is shown with three links, each link having two axes of motion, However, it can be appreciated by someone skilled in the art that the method and apparatus of the present invention is equally applicable to a robotic arm having any number of links, each link having any number of axes of motion.

Figure 4A:
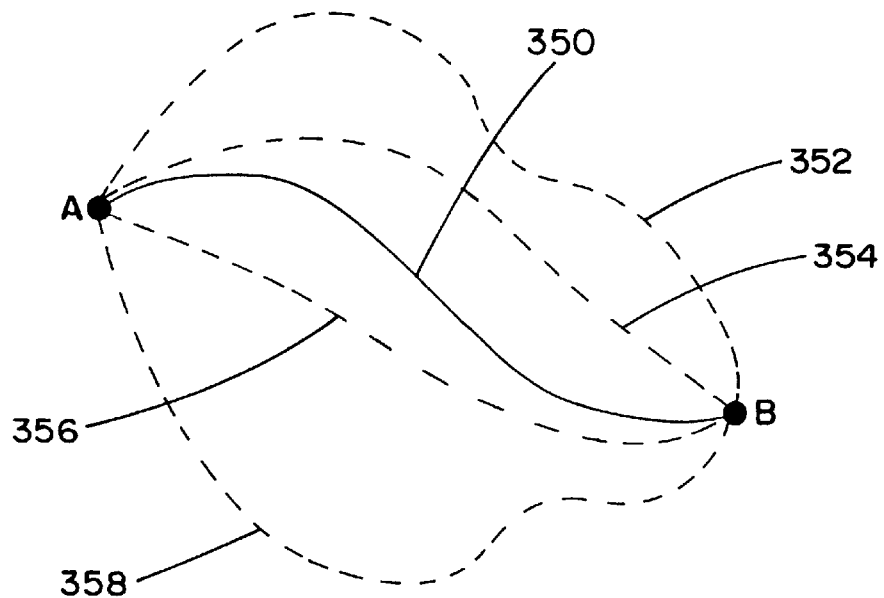
FIG. 4A illustrates a point to point type of machine component trajectory.

The path that is taken by the computer controlled machine is typically one of two types. The first type is a point to point type as illustrated in FIG. 4A. An example of this type of path is where the end effector 316 of a robotic arm 300 needs to move from a beginning point A to an end point B and the path it takes in getting from point A to point B is not important. For instance, in a pick and place situation where the end effector 316 picks up a part at point A and places it at point B, the path the end effector 316 takes in getting from point A to point B is unimportant. In this situation the path is not defined, however, the path that the machine takes may contain harmonics which can cause the computer controlled machine to vibrate.

For instance, paths 350, 352, 354, 356, and 358 all start at point A and end at point B. Therefore, all paths are acceptable in a pick and place situation. However, one path 350 minimizes the harmonics associated with the machine components movement from point A to point B.

Figure 4B:
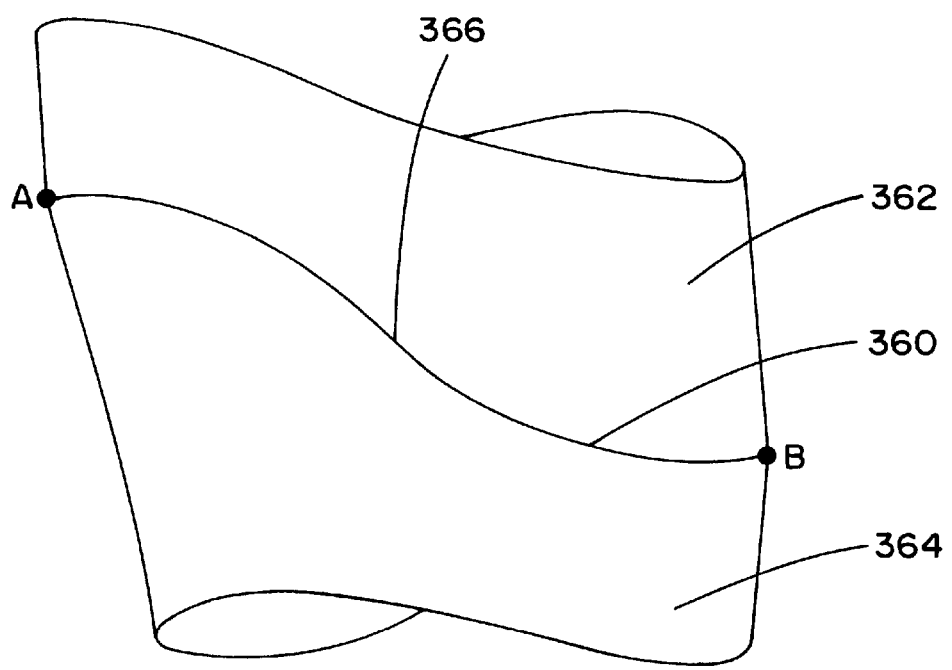
FIG. 4B illustrates a known path type of machine component trajectory.

The second type of path, as illustrated in FIG. 4B, also moves from a beginning point A to an end point B. However, in this situation the path that is followed from point A to point B is important. An example of this type is where a robotic arm 316 follows the contours of a joint 360 for welding a first part 362 and a second part 364 together. In this situation the path 366 is defined, however, that path 366 may contain harmonics which can cause the computer controlled machine to vibrate.

The apparatus and method of the present invention plans and generates a low harmonic trajectory along the path 366 for minimizing any vibrations associated with the computer controlled machine's movement.

Figure 1:
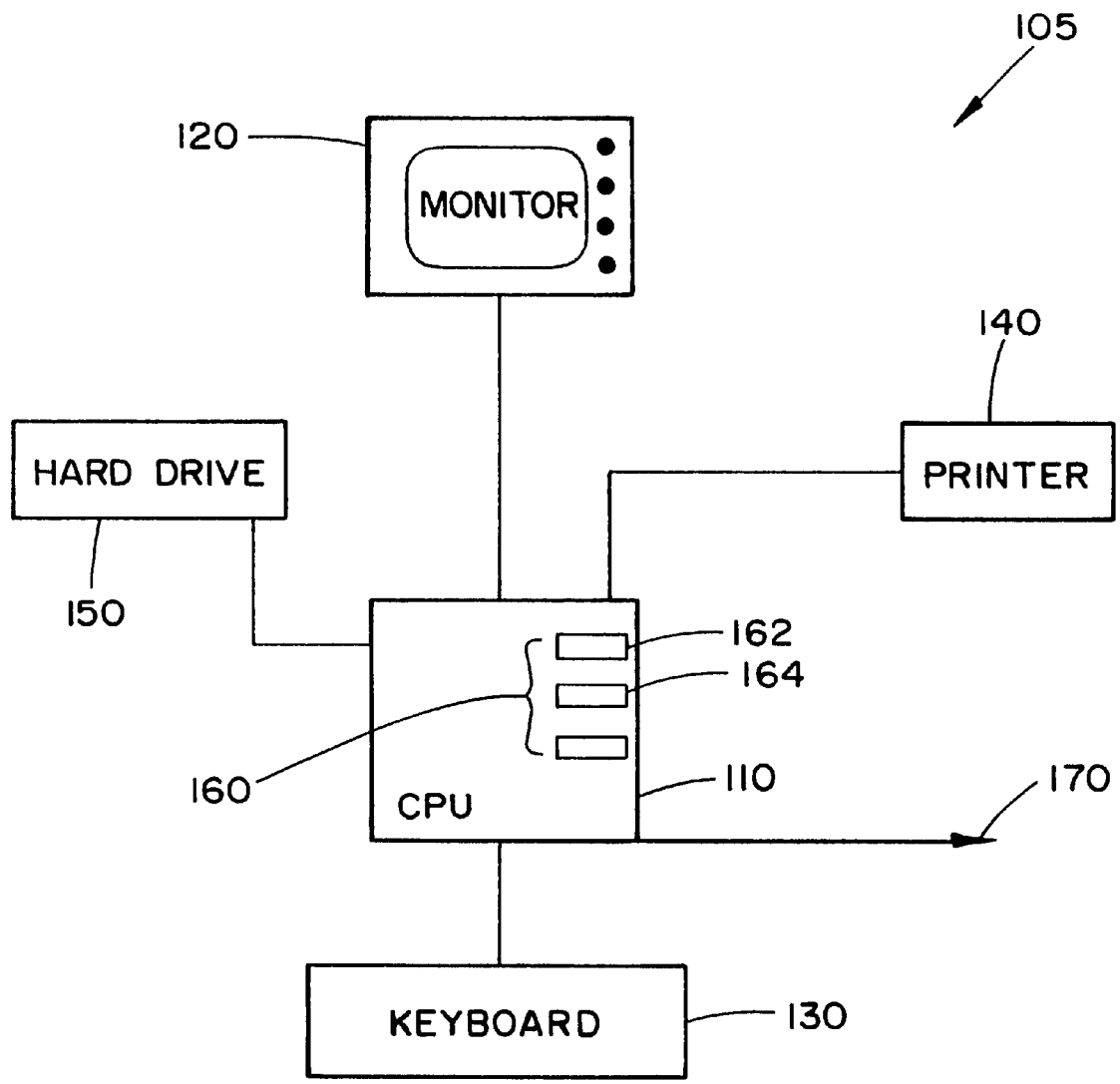
FIG. 1 illustrates a schematic of a computer system utilized in the apparatus and method of the present invention.
Figure 5:
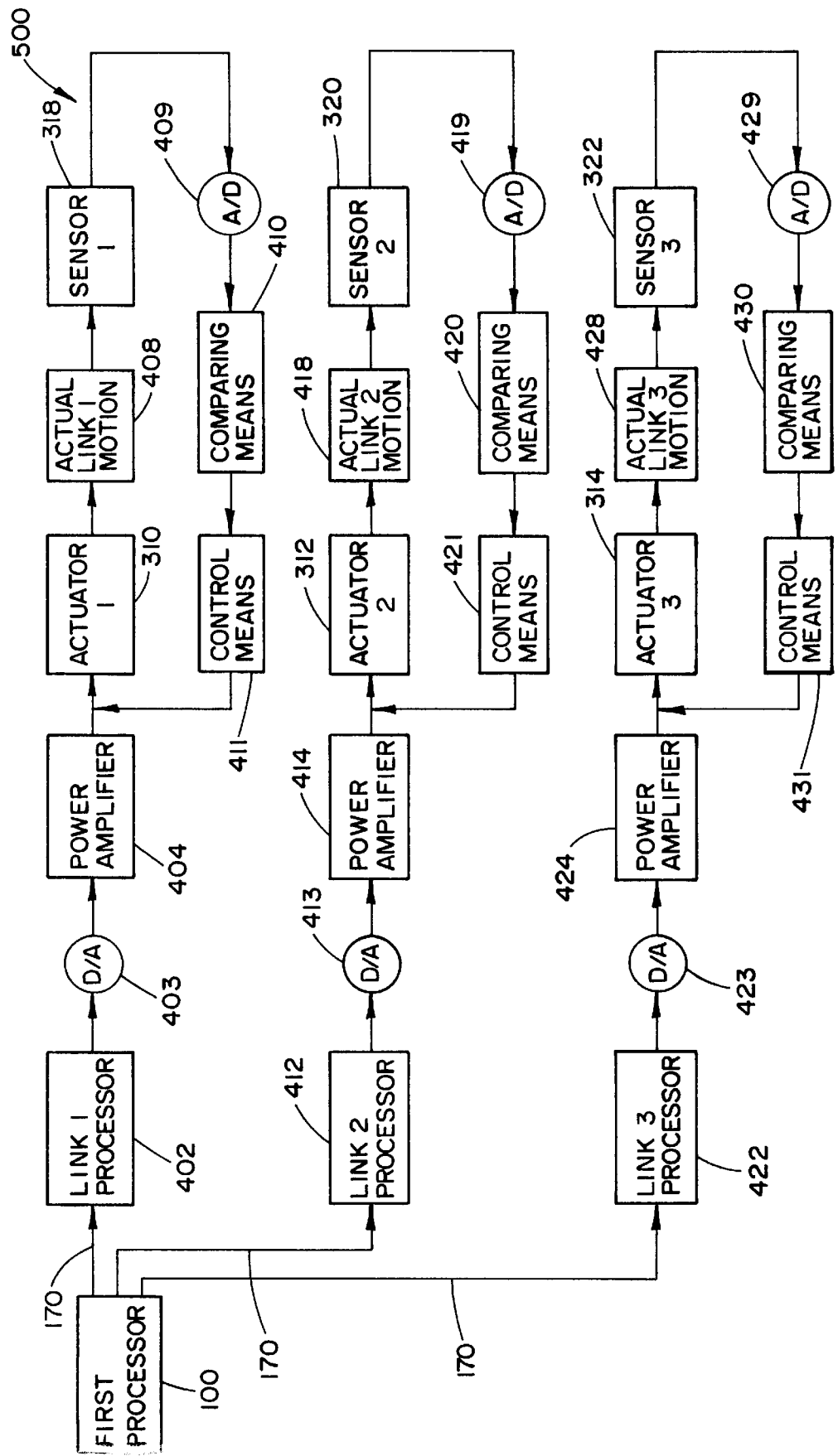
FIG. 5 illustrates a schematic of the apparatus of the present invention as applied to the robotic arm of FIG. 3.

Referring now to FIG. 5, a schematic of the preferred apparatus is illustrated for the robotic arm of FIG. 3, and generally referred to by reference numeral 500, in which a first processor 100 having a first circuit means and an input device is shown. Preferably, as shown in FIG. 1, the first processor is a personal computer 105, wherein the circuit means is a CPU 110, and the input device is preferably a keyboard 130. The personal computer preferably also has a monitor 120, an output device 140 such as a printer, and a storage device 150 such as a hard drive.

Desired motion information is input into the first processor 100 to determine the low-harmonic trajectory that a machine component will take. It is understood to someone skilled in the art that a trajectory includes not only the parameters constraining the shape of a path but also its time history, such as initial and final conditions or intermediate positions that the time history is required to interpolate, as well as parameters specifying the duration and the basic frequencies of the time history.

The output of the device can be a trajectory, its first order, second order, and higher order derivatives with respect to time or any combination thereof. The physical form of the output can be an electric signal 170, as shown in FIGS. 1 and 5. The electric signal can be an analog current or voltage or it can be a digital signal specifying the parameters which describe the output low-harmonic trajectory.

The first processor computes the low harmonic trajectory according to the following formula (2) for a n-harmonic trajectory pattern in Bezier form where $b_i$ are Bezier control points and $\overline{B}_i^{2n}$ are Bernstein basis functions of order n;

$$b_0^{2n} = \sum_{i=0}^{2n} b_i \overline{B}_i^{2n}. \tag{2}$$

There are at least four representations for the Bernstein basis function, which are presented as follows:

1. Half Angle Representation

Circular barycentric coordinates r and s are introduced such that;

$$r = \frac{\sin(\omega t/2)}{\sin(\omega t_e/2)}, \quad s = \frac{\sin(\omega(t_e - t)/2)}{\sin(\omega t_e/2)}. \tag{3}$$

Bernstein basis harmonics of order n are then given by the following equation;

$$\overline{B}_i^{2n}(t,t_e) = \omega_{i,n} B_i^{2n}(r,s) \tag{4}$$

where $B_i^{2n}(r,s)$ denote homogeneous Bernstein polynomials of degree 2n;

$$B_i^{2n}(r, s) = \binom{2n}{i} r^i s^{2n-i}. \tag{5}$$

The coefficients $w_{i,n}$ referred to as harmonic weights of order n, have to be such that $B_i^{2n}(r,s)$ form a partition of unity, i.e.,;

$$\sum_{i=0}^{2n} w_{i,n} B_i^{2n}(r, s) = (w_{0,1} r^2 + 2 w_{1,1} rs + w_{2,1} s^2)^n = 1. \tag{6}$$

Expanding the above relation and comparing the coefficients, one can show that the weights satisfy the following recursive formula;

$$w_{i,n} = \frac{i(i-1)}{2n(2n-1)} w_{2,1} w_{i-2,n-1} + \frac{2i(2n-i)}{2n(2n-1)} w_{1,1} w_{i-1,n-1} + \frac{(2n-i)(2n-i-1)}{2n(2n-1)} w_{0,1} w_{i,n-1}. \tag{7}$$

For n=1, the first order weights are given by;

$$\omega_{0,1}=1, \omega_{1,1}=\cos(\omega t_e/2), \omega_{2,1}=1. \tag{8}$$

2. Rational Bezier Form

Let $T=\tan((\omega t_e)/2)$ and $u=\tan(\omega t/2)/T$ then Bezier harmonic basis function in rational Bezier form are given by the following equation;

$$\overline{B}_i^{2n}(u; T) = \frac{w_{i,n} B_i^{2n}(u)}{\sum_{i=0}^{2n} w_{i,n} B_i^{2n}(u)}, \tag{9}$$

where the associated harmonic weights $w'_{i,n}$ can be generated using the same recurrence relation as equation (7) but with slightly different first order weights;

$$\omega'_{0,1}=\omega'_{1,1}=1, \omega'_{2,1}=1+T^2 \tag{10}$$

In this case, the corresponding Bernstein-Bezier harmonic curve of order n is also referred to as a n-Harmonic Rational Bezier (nHRB) curve.

3. Full-Angle Representation

Using trigonometry, the representation of Bernstein-Bezier harmonics in terms of half angle ($\omega t/2$) can be converted to full-angle representation in terms of ($\omega t$). The most straight forward way of achieving this is to take advantage of the following recurrence relationship for basis harmonics;

$$\overline{B}_1^{2n} = \tilde{B}_0^{2(n-1)} + \tilde{B}_1^{2} \overline{B}_{i-1}^{2(n-1)} + \tilde{B}_2^{2} \overline{B}_{i-2}^{2(n-1)}, \tag{11}$$

Where $\overline{B}_i^2$ are Bernstein 1-harmonic basis functions. In terms of full angles, they are given by:

$$\overline{B}_0^2(t; T) = \frac{1+T^2}{2T^2} - \frac{1}{T}\sin(\omega t) + \frac{-1+T^2}{2T^2}\cos(\omega t), \tag{12}$$

$$\overline{B}_1^2(t; T) = -\frac{1}{T^2} + \frac{1}{T}\sin(\omega t) + \frac{1}{T^2}\cos(\omega t)$$

$$\overline{B}_2^2(t; T) = \frac{1+T^2}{2T^2} - \frac{1+T^2}{2T^2}\cos(\omega t).$$

For example, when n=2, Bernstein basis 2-harmonics can be generated directly using 1-harmonic recursion [equation (11)]. In matrix form, they are given by $[\overline{B}]=[h][H_4]$ where $[\overline{B}]=[\overline{B}_0^4(t;T) \ \overline{B}_1^4(t;T) \ \overline{B}_2^4(t;T) \ \overline{B}_3^4(t;T) \ \overline{B}_4^4(t;T)]$, $[h]=[1 \ \sin(\omega t) \ \cos(\omega t) \ \sin(2\omega t) \ \cos(2\omega t)]$, and $[H_4]$ is the 2-harmonic basis matrix;

$$[H_4] = \begin{bmatrix} \dfrac{3(1+T^2)^2}{8T^4} & -\dfrac{3(1+T^2)}{2T^4} & \dfrac{(3+T^2)^2}{4T^4} & -\dfrac{3(1+T^2)}{2T^4} & \dfrac{3(1+T^2)^2}{8T^4} \\ -\dfrac{1+T^2}{T^3} & \dfrac{3+T^2}{T^3} & -\dfrac{3+T^2}{T^3} & \dfrac{3+T^2}{T^3} & 0 \\ \dfrac{T^4-1}{2T^4} & \dfrac{2}{T^4} & -\dfrac{3+T^2}{T^4} & \dfrac{2(1+T^2)}{T^4} & -\dfrac{1+T^2}{2T^4} \\ \dfrac{1-T^2}{2T^3} & \dfrac{T^2-3}{2T^3} & \dfrac{3+T^2}{2T^3} & -\dfrac{1+T^2}{2T^3} & 0 \\ \dfrac{T^4-6T^2+1}{8T^4} & \dfrac{3T^2-1}{2T^4} & -\dfrac{T^4+2T^2-3}{4T^4} & \dfrac{1+T^2}{2T^4} & \dfrac{(1+T^2)^2}{8T^4} \end{bmatrix} \quad (13)$$

Similarly, half-angle and rational representations of Bernstein harmonic basis functions of order n can also be generated recursively from their respective 1-harmonic basis functions using the recurrence relation [equation (11)] without the need for precomputing the weights.

4. The Harmonic deCasteljau Algorithm

The Bernstein-Bezier harmonic curve of order n as given by equation (2) can also be generated recursively using the harmonic deCasteljau algorithm;

$$b_i^{2n} = \bar{B}_0^{2(n-1)} + \bar{B}_1^2 b_{i+1}^{2(n-1)} + \bar{B}_2^2 b_{i+2}^{2(n-1)}. \quad (14)$$

In addition to the 4 methods for generating the low harmonic trajectory, a path can be approximated by dividing the path into a plurality of segments, each segment having segment junctions at the point of division. Each segment is then approximated by the above equations with appropriate splicing at the segment junctions to provide path continuity.

Referring back to FIG. 5, the low harmonic trajectory (e.g., end positions, velocities, accelerations for motions from one position to the next along a path of motion) computed from one of the preceding algorithms is then output 170 to a second processor for each link in the robotic arm 402, 412, and 422 for links 304, 306, and 308 respectively. The second processors 402, 412, and 422 follow the algorithm presented to it by the first processor 100 to determine the points along a low-harmonic trajectory and outputting those points as an electrical signal representation.

Referring now to FIG. 1, the second processor is preferably a computer board 162 which plugs into one of the computer's 105 expansion slots 160. The second processors 402, 412, and 422 would then share the CPU 110, and peripheral devices 120, 130, 140 and 150 with the personal computer 105.

The outputted signal from the second processors 402, 412, and 422 is then input into a power amplifier 404, 414, and 424 for amplifying the voltage or current of the signal to a level such that it can drive the actuators 310, 312, and 314. As discussed previously, the actuators 310, 312, and 314 control the motion along each axis of operation. The power amplifiers 404, 414, and 424 are preferably computer boards 164 which plug into one of the expansion slots 160 of the personal computer,105 as shown in FIG. 1. The power amplifiers 404, 414, and 424 would then share the CPU 110, and peripheral devices 120, 130, 140 and 150 with the personal computer 105.

The signal to the actuators 310, 312, and 314 represent a desired motion that the actuators 310, 312, and 314 should take in order to follow the generated low-harmonic trajectory. However, the desired motion typically results in an actual motion (shown schematically in FIG. 5 as 408, 418, and 428 for links 304, 306, and 308, respectively). The actual motion 408, 418, and 428 is not necessarily equivalent to the desired motion, resulting in an error.

For this reason, a feedback control loop is necessary for the generation of a feedback control signal to correct the error. Preferably generation of the feedback control signal is achieved by the sensors 318, 320, and 322 which sense the actual motion 408, 418, and 428 and output an electrical signal representing the sensed motion. Comparing means 410, 420, and 430 are then provided for comparing the sensed actual motion to the desired motion for determining the error in the path and its time history. The feedback control loop is completed by control means 411, 421, and 431 for generating the feedback control signal based upon the measured error for correction of the error. The feedback control signal is preferably input into the actuators 310, 312, and 314, but can also be inputted into the first 100 or second processors 402, 412, and 422.

The comparing means preferably comprises the CPU 110 of the personal computer 105. The comparing means 410, 420, and 430 would then share the peripheral devices 120, 130, 140 and 150 with the personal computer 105. Likewise the control means can comprise the CPU 110 of the personal computer 105. Preferably the first processor 100; the second processors 402, 412, and 422;, the power amplifiers 404, 414, and 424; the comparing means 410, 420, and 430; and the control means 411, 421, and 431 are all integrated into the personal computer 105, providing a compact unit for planning and generating the low-harmonic trajectory.

The electrical signal output by the second processors 402, 412, and 422 are preferably a digital signal which necessitates the need for a digital to analog convertors 403, 413, and 423 to convert the signal before input into the power amplifiers 404, 414, and 424 respectively.

Similarly the sensor output signal can be either digital or analog. Examples of analog sensors include Hall effect sensors and potentiometers. An example of a digital sensor is an optical encoder. Preferably, the sensor's outputs are digital and can be inputted directly into the comparing means 410, 420, and 430. However, if the sensor's outputs are analog, analog to digital convertors 409, 419, and 429 are needed to convert the analog outputs to a digital signal before inputting into the comparing means 410, 420, and 430.

Figure 6A:
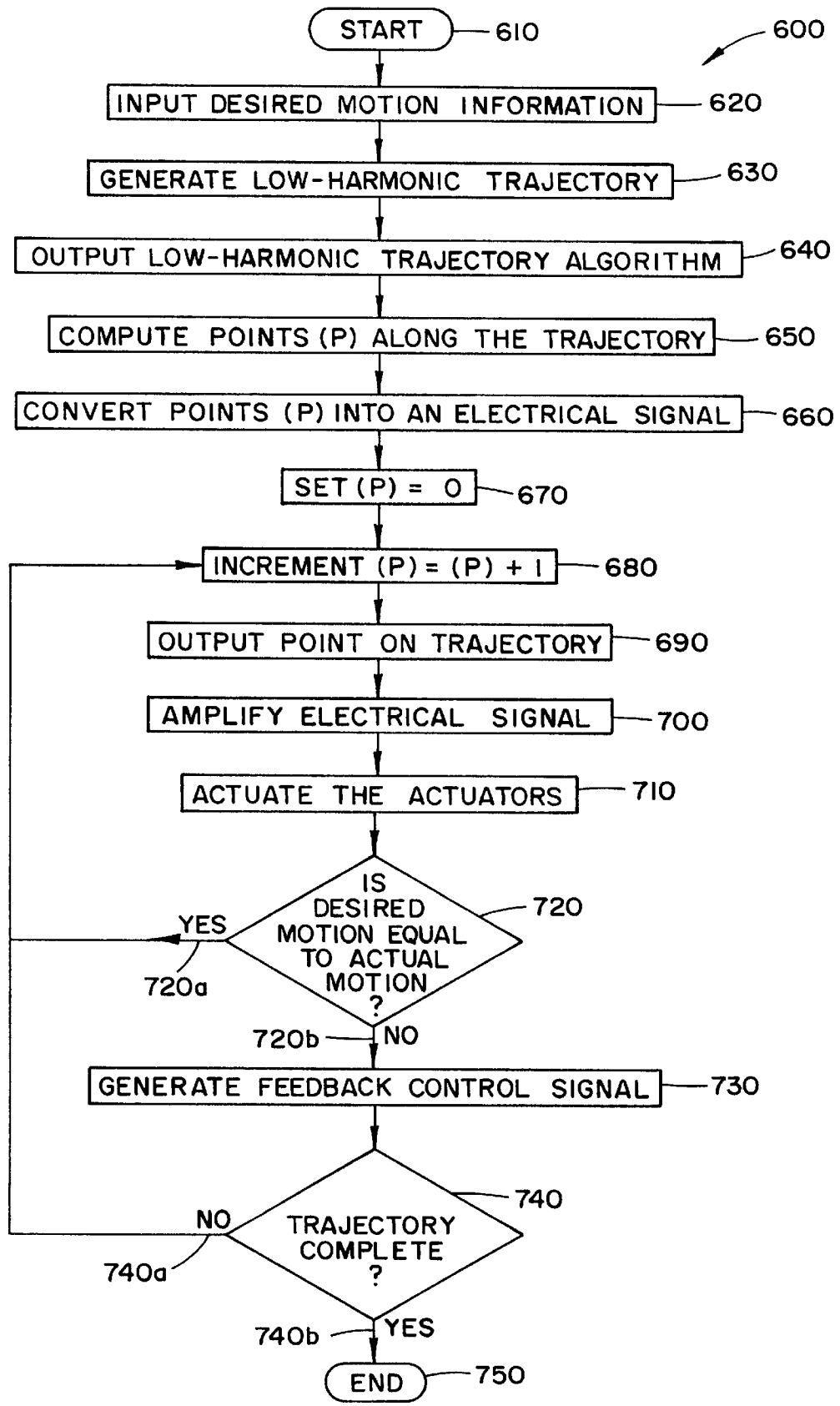
FIG. 6A illustrates a flow diagram showing the steps of the method of the present invention.

The method utilized by the apparatus of the present invention will now be discussed with reference to FIGS. 6A and 6B in which the method, referred to generally by reference numeral 600, is represented by a flow diagram. Referring first to FIG. 6A, the method is initiated at step 610. The desired motion information is then input into the first processor at step 610. The first processor generates a low-harmonic trajectory at step 630 from the input desired motion information according to equations (2) through (14) discussed previously. The low-harmonic trajectory algorithm is output at step 640 from the first processor to the second processor(s). The second processor computes the points along the trajectory at step 650 and converts the points into an electrical signal representation having a voltage and/or a current at step 660. The points are then initialized at point zero at step 670 and incremented at step 680. Point one corresponds to the first point on the generated low harmonic trajectory.

A first electrical signal corresponding to the first point on the trajectory is then output at step 690 to input the power amplifier(s). The first electrical signal is then amplified at step 700 resulting in a second electrical signal which inputs the actuator(s) and actuates the actuator(s) at step 710 according to the inputted second electrical signal to perform a desired motion. The actuation results in an actual motion. At step 720 the actual motion and desired motion are compared to compute an error.

If no error exists or the error is within a predetermined tolerance, then the method 600 proceeds along route 720*a* and loops back to step 680. At step 680, P is incremented to the second point on the generated low harmonic trajectory and steps 680 through 720 are repeated for the second point. If the desired motion is not equal to the actual motion within the predetermined tolerance, then the method 600 proceeds along route 720*b* and a feedback control signal is generated at step 730 to correct the error.

Figure 6B:
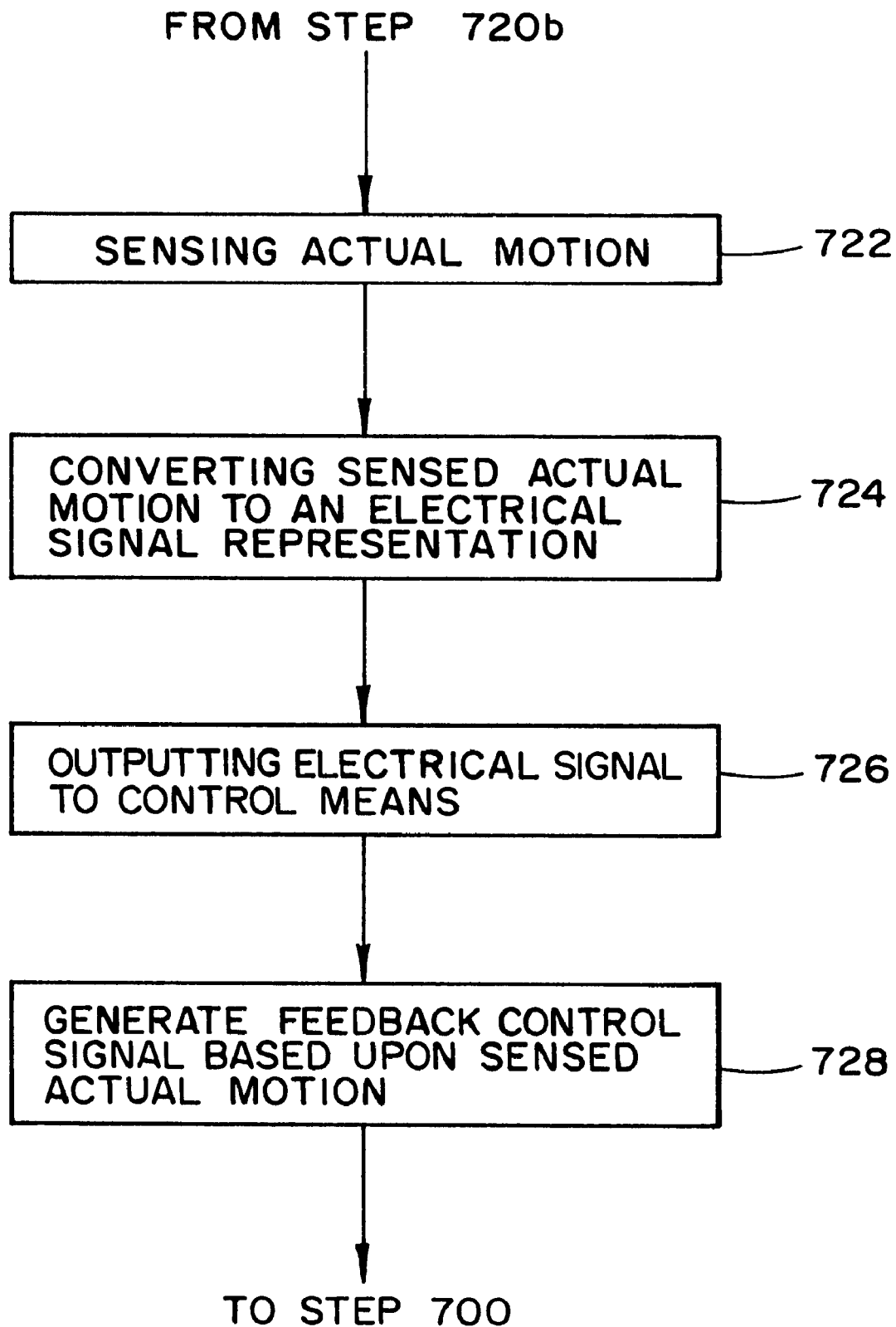
FIG. 6B illustrates a flow diagram showing the sub-steps of a step of the method of FIG. 6A.

Referring now to FIG. 6B, the preferred method for generating the feedback control signal is illustrated in which the actual motion is sensed by the sensor(s) at sub-step 722. The sensed actual motion is then converted to an electrical signal representation at sub-step 724 and output into a control means at sub-step 726. The control means then generates the feedback control signal at step 728 based upon the sensed actual motion, and inputs it into the power amplifier at step 700.

After the feedback control signal is generated, step 740 determines if the trajectory is complete. If points remain on the generated low harmonic trajectory then the method 600 will follow route 740*a* in which steps 680 through 730 are repeated for all remaining points on the generated low harmonic trajectory. Loop 740*a* repeats until the trajectory is complete whereby step 740 directs the method 600 to follow route 740*b* at which time the method 600 terminates at step 750.

Alternatively, termination can also occur if a predetermined number of cycles has been completed, if a predetermined time lapse has occurred or if the operator intervenes and sends a termination signal to the apparatus.

As discussed previously with regard to the apparatus, the generating step (630) can be computed with any of the four algorithms discussed for the entire desired path and the time history of motion along the path. Alternatively, as also discussed previously with regard to the apparatus, the desired path can be divided into segments, forming segment junctions at the points of division. Each segment is then approximated by a low-harmonic trajectory according to the same equations. Appropriate splicing is performed at the segment junctions to provide path continuity.

Also as previously discussed with regard to the apparatus, the first processor output can be either a digital or analog signal. Likewise the sensor output can be either a digital or analog output. In the situation where the first processor output is digital, the output must be converted to an analog signal before being input into the power amplifier. Similarly, if the sensor output is analog, the analog signal must be converted to a digital signal before being input into the comparing means.

From the foregoing, it becomes readily apparent to one skilled in the art that the novel apparatus and method of the present invention offers improvements over currently employed devices and methods. Due to the inventive algorithms employed by the apparatus and method of the present invention, the advantages offered by the present invention re[]sides in:

(a) the use of Bezier Curves to synthesize trajectories within the dynamic response limitation of the actuators of a motion machine to avoid excitation of the natural modes of vibration of the machine;

(b) the use of a special class of rational Bezier curves for synthesizing joint trajectories of a computer controlled machine with minimal amplitudes of high harmonics of the actuator torques (forces) required for accurate tracking of the trajectory;

(c) providing a low harmonic trajectory in a form that is compatible with current computer aided design systems; and (d) providing a low harmonic trajectory in a form which provides intuitive control over the shape of the harmonic trajectory.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

We claim:

1. A method for generating a low-harmonic trajectory for computer controlled machinery, the method comprising the steps of:

(a) inputting desired motion information into a first processor;

(b) generating a low-harmonic trajectory from the desired motion information according to the following equation, where $b_i$ are Bezier control points and $\overline{B}_i^{2n}$ are Bernstein harmonic basis functions of order n:

$$b_0^{2n} = \sum_{i=0}^{2n} b_i \overline{B}_i^{2n}$$

(c) outputting the generated low-harmonic trajectory from the first processor to input a second processor;

(d) computing points along the low-harmonic trajectory;

(e) converting the points into an electrical representation having a current and/or a voltage;

(f) outputting a first electrical signal corresponding to a point on the trajectory to input a power amplifier;

(g) amplifying the first electrical signal resulting in a second electrical signal, for actuating an actuator according to the inputted second electrical signal to perform a desired motion resulting in an actual motion;

(h) comparing the actual motion to the desired motion in a comparing means to compute an error;

(i) generating a feedback control signal to correct the error; and (j) repeating steps (d) through (i) for all points on the trajectory until the trajectory is complete or the operation is terminated.

2. The method of claim 1, wherein step (j) comprises the sub-steps of:

(i) sensing the actual motion performed by the actuator with a sensor to determine if the actual motion equals the desired motion within a predetermined tolerance;
(ii) converting the sensed actual motion to an electrical signal representation;
(iii) outputting the electrical signal from the sensor to input a control means; and
(iv) generating a control signal for correcting the error sensed.

3. The method of claim 1, wherein the desired motion information are one of beginning and end positions, velocities, accelerations, their time derivatives, and any combination thereof.

4. The method of claim 1, wherein the Bernstein harmonic basis functions are calculated by a half-angle representation.

5. The method of claim 1, wherein the Bernstein harmonic basis functions are calculated from a full-angle representation.

6. The method of claim 1, wherein the Bernstein harmonic basis functions are calculated from a rational Bezier form.

7. The method of claim 1, wherein the Bernstein harmonic basis functions are calculated from a harmonic deCasteljau algorithm.

8. The method of claim 1, wherein the Bernstein harmonic basis functions are calculated from a low-harmonic rational Bezier curve which approximates the path and the time history of motion along the path.

9. The method according to claims 4, 5, 6, 7, or 8, wherein the desired motion information includes only the end and beginning point position, velocity, acceleration, their time derivatives, and/or any combination thereof.

10. The method according to claims 4, 5, 6, 7, or 8, wherein the path is known and a low-harmonic trajectory is computed to approximate a desired path of motion and the time history of motion along that path.

11. The method of claim 10, wherein the path is divided into segments forming segment junctions at the points of division, wherein each segment is approximated by a low-harmonic trajectory with appropriate splicing at the segment junctions to provide path continuity.

12. The method of claim 2, wherein the output from the first processor is in the form of an analog signal.

13. The method of claim 12, wherein the sensor output is in the form of analog signal and wherein the method further comprises the step of converting the sensor output signal from an analog signal to a digital signal before inputting into the comparing means.

14. The method of claim 12, wherein the sensor output is in the form of a digital signal.

15. The method of claim 2, wherein the output from the first processor is in the form of a digital signal and wherein the method further comprises the step of converting the digital signal into an analog signal before inputting the actuator.

16. The method of claim 15, wherein the sensor output is in the form of a digital signal.

17. The method of claim 15, wherein the sensor output is in the form of an analog signal, and wherein the method further comprises the step of converting the sensor output from an analog signal into a digital signal before inputting into the comparing means.

18. The method of claim 1, wherein the desired trajectory is one of a position, velocity, acceleration, their time derivatives, and any combination thereof.

19. An apparatus for generating a low-harmonic trajectory for a computer controlled machine, the computer controlled machine having at least one axis of motion, the apparatus comprising:

a first processor having an input device for generating and outputting a low-harmonic trajectory from inputted desired motion information according to the following equation where $b_i$ are Bezier control points and $\overline{B}_i^{2n}$ are Bernstein harmonic basis functions of order n;

$$b_0^{2n} = \sum_{i=0}^{2n} b_i \overline{B}_i^{2n}$$

a second processor for receiving the outputted low-harmonic trajectory, computing points along the low-harmonic trajectory, and converting the points into an electrical signal having a current and/or voltage;

a power amplifier for receiving the electrical signal from the second processor and for amplifying the electrical signal;

actuating means for controlling the motion along each axis, whereby the received amplified signal from the power amplifier identifies the performance of a desired motion, the performance of the desired motion resulting in an actual motion;

sensing means for sensing the actual motion performed by the actuating means and for outputting the sensed actual motion in the form of an electrical signal;

comparing means for comparing the sensed actual motion to the desired motion for determining a measured error in the path and its time history; and control means for generating a feedback control signal based upon the measured error for correction of that error.

20. The apparatus of claim 19, wherein the feedback control signal is input into one of the actuating means, first processor, and second processor.

21. The apparatus of claim 19, wherein the computer controlled machine is a CNC machine having at least one operating axis.

22. The apparatus of claim 19, wherein the computer controlled machine is a robotic arm having at least two links.

23. The apparatus of claim 19, wherein the desired motion path and its time history along that path are one of beginning and end positions, velocities, accelerations, their time derivatives, and any combination thereof.

24. The apparatus of claim 19, wherein the Bernstein harmonic basis functions are calculated by a half-angle representation.

25. The apparatus of claim 19, wherein the Bernstein harmonic basis functions are calculated from a full-angle representation.

26. The apparatus of claim 19, wherein the Bernstein harmonic basis functions are calculated from a rational Bezier form.

27. The apparatus of claim 19, wherein the Bernstein harmonic basis functions are calculated from a harmonic deCasteljau algorithm.

28. The apparatus of claim 19, wherein the Bernstein harmonic basis functions are calculated from a low-harmonic rational Bezier curve which approximates the path and the time history of motion along the path.

29. The apparatus of claim 19, wherein the output from the first processor is in the form of an analog signal.

30. The apparatus of claim 29, wherein the sensing means output is in the form of an analog signal and wherein the apparatus further comprises a converting means for converting the sensing means output signal to a digital signal before inputting into the comparing means.

31. The apparatus of claim 30, wherein the sensing means is one of a Hall effect sensor and a potentiometer.

32. The apparatus of claim 29, wherein the sensing means output is in the form of a digital signal.

33. The apparatus of claim 32, wherein the sensing means is an optical encoder.

34. The apparatus of claim 19, wherein the output from the first processor is in the form of a digital signal, and wherein the apparatus further comprises a converting means for converting the digital signal from the first processor into an analog signal before inputting into the actuating means.

35. The apparatus of claim 34, wherein the sensing means output is in the form of a digital signal.

36. The apparatus of claim 35, wherein the sensing means is an optical encoder.

37. The apparatus of claim 34, wherein the sensing means output is in the form of analog signal, and wherein the apparatus further comprises a converting means for converting the sensing means output from analog signal into a digital signal before inputting the comparing means.

38. The apparatus of claim 37, wherein the sensing means is one of a Hall effect sensor and a potentiometer.

39. The apparatus of claim 19, wherein the desired motion is one of a position, velocity, acceleration, their derivatives, and any combination thereof.

40. The apparatus of claim 19, wherein the first processor is a personal computer having a central processing unit.

41. The apparatus of claim 40, wherein the personal computer further having at least one expansion slot.

42. The apparatus of claim 41, wherein the second processor comprises a computer board for plugging into the expansion slot of the personal computer.

43. The apparatus of claim 41, wherein the power amplifier comprises a computer board for plugging into the expansion slot of the personal computer.

44. The apparatus of claim 40, wherein the comparing means comprises the central processing unit of the personal computer.

45. The apparatus of claim 40, wherein the control means comprises the central processing unit of the personal computer.

46. The apparatus of claim 19, wherein the actuating means comprises one of a linear or rotary direct current servo motor, a linear or rotary direct drive motor, and a stepper motor.

* * * * *